June 7, 1949.                    C. W. TABER                    2,472,177
WELDING ELECTRODE HOLDER
Filed Sept. 2, 1947
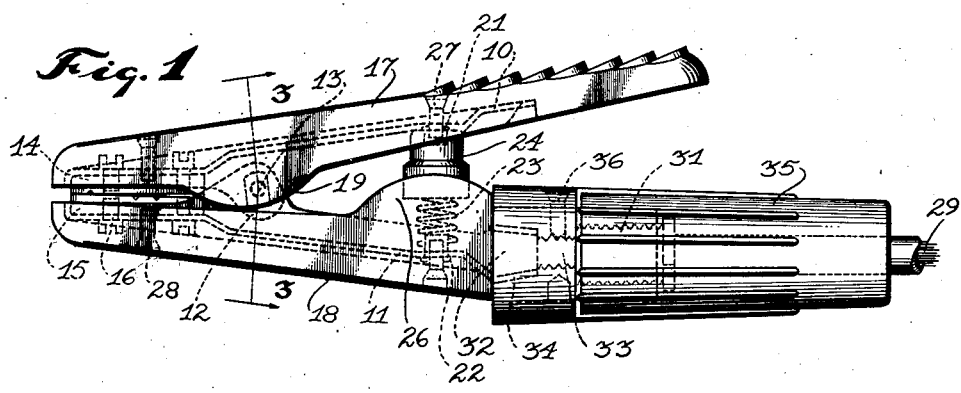
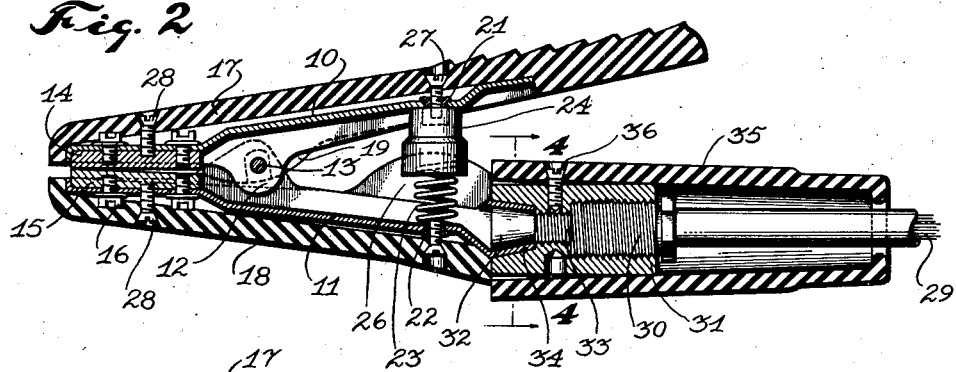
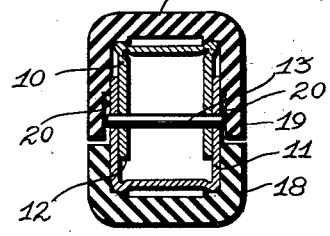
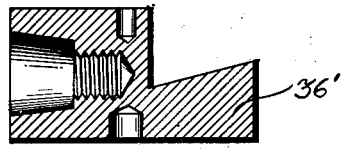
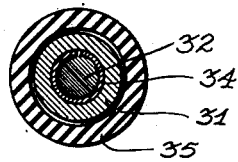
INVENTOR.
Clifford W. Taber
BY
Hazard & Miller
Attorneys Patented June 7, 1949

2,472,177

UNITED STATES PATENT OFFICE 2,472,177

WELDING ELECTRODE HOLDER

Clifford W. Taber, Pasadena, Calif.

Application September 2, 1947, Serial No. 771,641

3 Claims. (Cl. 219—8)

This invention relates to improvements in welding electrode holders.

A primary object of the invention is to provide an improved welding electrode holder wherein there is a pair of opposed jaw carrying members hingedly connected together and spring actuated so as to cause the jaws to clampingly engage upon a welding electrode, the jaw carrying members being arranged symmetrically with relation to the opposed faces of the jaws and with respect to the hinge pin hingedly connecting them together, with the single exception of the connection of the cable to one of the jaw carrying members which is so arranged that the span between the handle portions of the jaw carrying members will not be excessive, thus facilitating opening of the electrode holder when it is necessary to replace electrodes.

Another object of the invention is to provide an improved electrode holder consisting of two jaw carrying members hingedly connected together with the jaw carrying members being covered by insulating covers extending over the outer and lateral sides of the jaw carrying members to effectively protect and insulate them in the event that the electrode holder is positioned or dropped on a ground surface and wherein the hinge pin hingedly connecting the jaw carrying members together is retained in its position entirely by one of the covers which is detachably secured to its jaw carrying member. In this manner whenever it is necessary to grind or polish the electrode engaging surfaces of the jaws on removal of the detachable cover the hinge pin can be easily withdrawn to enable the jaw carrying members to be separated from each other.

Another object of the invention is to provide an electrode holder wherein one of the insulating covers extending around a jaw carrying member has lateral side portions that extend over the sides of the compression spring that urges the jaw carrying members into clamping position and wherein the opposed jaw carrying member has an insulating spring seat bridging or spanning the space between the opposed jaw carrying members and said portions whereby the spring is effectively surrounded by insulating material.

Still another object of the invention is to provide an electrode holder wherein internally threaded ferrules are driven through the opposed jaw carrying members one of which provides a spring seat for the compression spring and the other of which secures the insulating spring seat to the jaw carrying member and wherein screws are driven through the insulating covers and into these ferrules for detachably fastening the insulating covers to the jaw carrying members.

A still further object of the invention is to provide a novel means for forming an electrical connection between the cable connection and one of the jaw carrying members of the electrode holder.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of the improved electrode holder embodying the present invention;

Fig. 2 is a longitudinal vertical section through the same;

Fig. 3 is a transverse section taken substantially upon the line 3—3 upon Fig. 1 in the direction indicated;

Fig. 4 is a vertical section taken substantially upon the line 4—4 upon Fig. 1; and Fig. 5 is a sectional view illustrating a modified form of cable connector construction that may be employed.

Referring to the accompanying drawings wherein similar reference characters designate similar parts throughout, the improved electrode holder consists of two opposed jaw carrying members 10 and 11 preferably formed of copper or other highly conducting material. These jaw carrying members are channel shaped in cross section throughout the major portions of their lengths and have overlapping ears 12 through which a hinge pin 13 extends to hingedly connect the jaw carrying members intermediate their ends. At the forward ends of the jaw carrying members there are jaws 14 and 15 which are preferably formed of copper and which are normally urged towards each other for mutual clamping engagement upon a welding electrode, not shown. These jaws are secured in place such as by screws 16. Insulating covers 17 and 18 are provided which are formed of suitable insulating material such as Bakelite. These covers are likewise channel shaped in cross section throughout substantial portions of their lengths and cover the outer and lateral sides of the jaw carrying members 10 and 11. The upper cover 17 has downwardly extending side portions 19 at the sides thereof which extend downwardly over the ends of the hinge pin 13. These side portions may be internally recessed as at 20 to accommodate the projecting ends of the hinge pin. The ends of the hinge pin preferably are not riveted over but merely abut against the portions 19 of the cover 17 when the cover is in applied position. In this manner the cover constitutes the sole means of maintaining the hinge pin in position extending through the ears 12. Consequently on removing the cover 17 from the electrode holder the pin 13 can be easily removed from between the jaw carrying members to enable them to be separated to polish or clean the faces of the jaws 14 and 15 whenever occasion requires.

Near the rear ends of the jaw carrying members hollow internally threaded ferrules 21 and 22 are driven through the jaw carrying members and have their outer ends riveted over. The ferrule 22 extends inwardly into the bottom of a coil compression spring 23 forming a spring seat for this compression spring. The ferrule 21 extends into an insulating button 24 which is recessed to accommodate the other end of the compression spring 23 and thus form a spring seat therefor. This button or spring seat 24 extends approximately one-half the distance between the jaw carrying members 10 and 11. The lower cover 18 has side portions 26 that extend upwardly so as to overlap the bottom of the spring seat 24. In this manner the side portions 26 cooperate with the spring seat 24 in effectively surrounding the spring 23 with insulating material. Screws 27 are driven through the covers 17 and 18 and into the insulating ferrules. Similarly screws 28 are driven through the covers and into the jaws 14 and 15. These screws preferably have their heads counter-sunk in the covers and upon unscrewing them the covers 17 and 18 can be readily removed from the jaw carrying members.

A novel feature of the construction resides in the manner in which the lower jaw carrying member is electrically connected to the cable 29. This cable is preferably leaded or otherwise secured in an externally threaded thimble 30 that is adapted to be screwed into a socket 31. The extreme rear end of the lower jaw carrying member 11 has its sides and bottom wrapped around a frusto-conical stud 32 as shown in Fig. 4. This stud has a threaded end 33 that is adapted to be screwed into the socket. The socket has a tapered recess 34 and when the stud is tightened therein it effectively draws and clamps the wrapped portion of the lower jaw carrying member 11 into firm electrical connection with the socket 31.

An insulating sleeve 35 extends around the socket 31 and the forward end of the cable 29 and may be locked thereon such as by a set screw 36 which is preferably tightened against the threaded portion 33 to prevent the stud from loosening or unscrewing within the socket.

In lieu of providing the cable 29 with an externally threaded thimble 30 the socket 31 may have the configuration illustrated in Fig. 5 wherein there is an undercut rabbeted tongue 36' formed on the rear end of the socket for connection thereto of a connector or electric coupling of the type disclosed in the application filed by me jointly with C. D. Hobson and John T. Newton on November 13, 1945, Serial No. 628,010.

It will be noted that the jaw carrying members and their covers are arranged symmetrically with relation to the planes of the opposed faces of the jaws 14 and 15 but that the axis of the connection of the cable 29 to the lower jaw carrying member 11 is approximately parallel to the planes of the jaws. Consequently the span between the overhanging handle portion of the cover 17 and the bottom of the sleeve 35 is not excessive to open the electrode holder whenever replacement of the welding electrodes is required. This arrangement is also conducive to a better balance of the electrode holder than in instances where the lower jaw carrying member extends forwardly in a direction coaxial with the end of the cable.

From the above-described construction it will be appreciated that an improved electrode holder is provided which is of relatively simple yet highly durable construction and the parts of which can be readily disassembled whenever occasion requires. The insulating parts are of relatively simple design and can be easily manufactured and effectively provide insulation surrounding conducting parts of the holder.

Various changes may be made in the details of construction without departing from the spirit and scope of the invention as defined by the appended claims.

I claim:

1. In a welding electrode holder, a pair of opposed jaw carrying members hingedly connected together, a compression spring between the members on the opposite side of the hinge from the jaws and urging said members to cause their jaws to clamp upon an electrode, insulating covers covering the outer and lateral sides of said members, one of said covers having side portions projecting over the sides of the spring, the opposed jaw carrying member carrying an insulating spring seat for the spring bridging the space between said portions and said opposed member.

2. In a welding electrode holder a pair of opposed jaw carrying members hingedly connected together, a compression spring between the members on the opposite side of the hinge from the jaws and urging said members to cause their jaws to clamp upon an electrode, insulating covers covering the outer and lateral sides of said members, one of said covers having side portions projecting over the sides of the spring, the opposed jaw carrying member carrying an insulating spring seat for the spring bridging the space between said portions and said opposed member, internally threaded ferrules extending through the jaw carrying members and into the spring and spring seat respectively, and screws screwed through the covers and into the ferrules for detachably fastening the covers to their respective jaw carrying members.

3. In a welding electrode holder, a socket to which a cable conducting electric current to the electrode holder is adapted to be connected, a tapered stud having a threaded extension screwed into said socket there being a tapered recess in the socket and a portion of the electrode holder wrapped around the tapered stud between the walls thereof and the walls of the tapered recess in the socket.

CLIFFORD W. TABER.

REFERENCES CITED

The following references are of record in the file of this patent:

UNITED STATES PATENTS

| Number | Name | Date |
| --- | --- | --- |
| 2,411,652 | Garibay | Nov. 26, 1946 |